Figure 1:
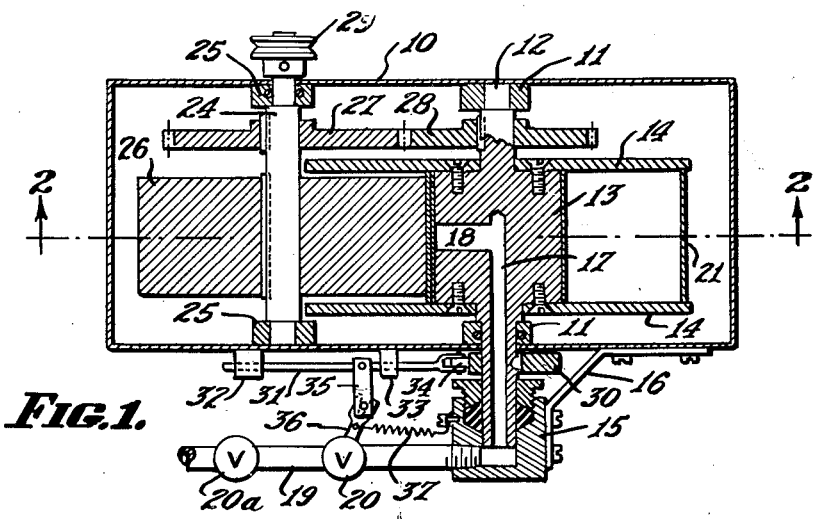

Jan. 8, 1952 J. R. AVERILL 2,581,830
COLLAPSIBLE WALL TYPE EXPANSION ENGINE
Filed Aug. 31, 1950 3 Sheets-Sheet 1

INVENTOR.
JOHN R. AVERILL,
BY Allen & Allen
ATTORNEYS.

Jan. 8, 1952    J. R. AVERILL    2,581,830
COLLAPSIBLE WALL TYPE EXPANSION ENGINE
Filed Aug. 31, 1950    3 Sheets-Sheet 2

INVENTOR.
JOHN R. AVERILL,
BY
Allen & Allen
ATTORNEYS.

Jan. 8, 1952  J. R. AVERILL  2,581,830
COLLAPSIBLE WALL TYPE EXPANSION ENGINE
Filed Aug. 31, 1950  3 Sheets-Sheet 3

INVENTOR.
JOHN R. AVERILL,
BY
Allen & Allen
ATTORNEYS.

Patented Jan. 8, 1952

2,581,830

UNITED STATES PATENT OFFICE 2,581,830

COLLAPSIBLE WALL TYPE EXPANSION ENGINE

John R. Averill, Webster Groves, Mo.

Application August 31, 1950, Serial No. 182,503

17 Claims. (Cl. 121—48)

This invention relates to an expansion engine of the rotary type, wherein a gas is introduced into the engine at an elevated pressure and discharged therefrom at a lower pressure. The expansion of the gas in the engine imparts rotary motion to the shaft of the machine, and thus converts the energy which is released by the gas into useful work. The expansion engine of the present invention is particularly useful where the gas, which is used as a source of energy, is accompanied by, or is dissolved in a liquid. The expansion engine of the present invention is useful not only where the primary consideration is the generation of power, but also where the primary consideration is the cooling of the gas passing through the machine. The expansion engine of the present invention is particularly useful in connection with flowing oil wells where gaseous compounds emerge in various proportions along with the oil. Generally speaking, in such oil wells there is no sharp distinction between the gaseous and liquid components. Usually, there is an intermediate group of hydrocarbons which may remain in the liquid phase or evaporate into the gaseous phase, depending upon the conditions which are present. These components are characterized by a very high API gravity, i. e. a very low density, and if the content of these "light ends" in the fluid is increased, it will have the effect of raising the gravity of the oil which is being produced. The maintenance of a high gravity in the oil produced is very much to the producer's advantage because the oil will bring a higher price per barrel. A loss of gravity as through heating, will, of course, reduce the price per barrel and also involve a loss in volume of oil produced. The lower the temperature at which the gas and oil can be separated, the more of the valuable light ends can be retained in the oil so that the oil will bring the highest price.

Various procedures have been utilized in the past to retain more of the light ends dissolved in the oil, and among these has been a differential method of separation, wherein the pressure is reduced in several stages and volatilized gas is removed from the oil at each stage.

Where a straight throttling type of expansion is employed, the separation takes place at a relatively high temperature. If an engine is provided to take energy from the expanding gases and do external work while reducing the pressure of the gas-oil mixture, a lower temperature of the outgoing product can be obtained than is possible with a straight throttling type of expansion. Thus, the use of such an engine would help to conserve the lighter ends and be beneficial from that standpoint, entirely aside from the value of the work performed by the engine.

Conventional expansion engines of the reciprocating or turbine types would not be feasible for this work because of the waxes and other solids or semi-solids which are present in most oils, which upon being cooled would build up deposits in flowlines and stock tanks, and would require heating of the production rather than cooling so as to avoid complete plugging of the lines and equipment. Thus, any of the familiar types of expansion engines would quickly be fouled by these deposits and such an operation would be impracticable.

With the foregoing considerations in mind, it is an object of the present invention to provide an expansion engine, which will be self cleaning in nature, so that the solids and semi-solids which would come out of solution on cooling, would be separated out without in any way fouling the engine. It is an ancillary object to provide an engine wherein the precipitation of these materials within the engine, rather than in the flowlines downstream, is encouraged.

It is another object of the invention to provide an engine which will minimize the contact of liquid and gaseous components during evaporation and expansion of the gas phase, and which will have a tendency to produce a recondensation of the heavier fraction of the gas phase and return it to the liquid phase.

It is still another object of the invention to provide an engine as above outlined, wherein foaming during reduction of pressure will be minimized, whereby the gas and liquid may be piped off the engine separately thereby eliminating the need for an external separator.

Other objects of the invention include the provision of such an engine of comparatively simplicity, and the provision of a rotary positive displacement engine with uni-directional flow of expanding gases.

Figure 2:
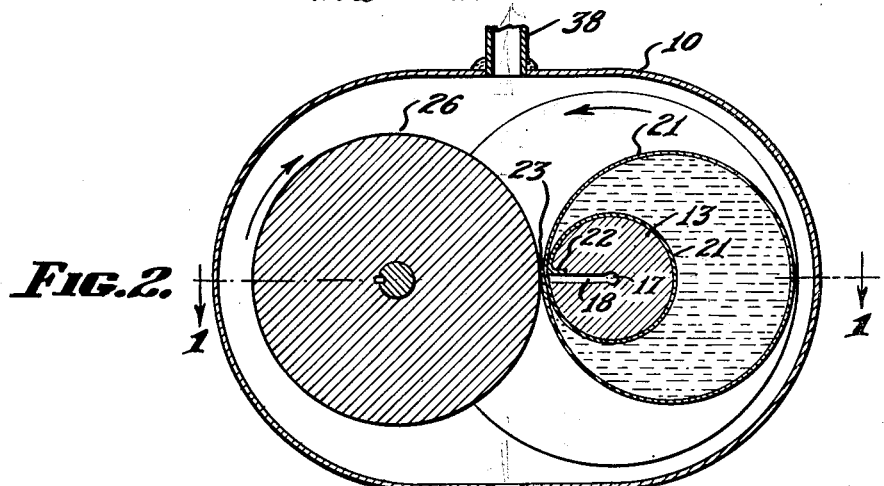
Figure 3:
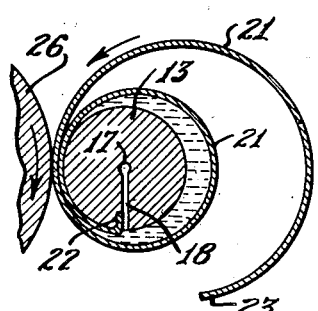
Figures 4, 5:
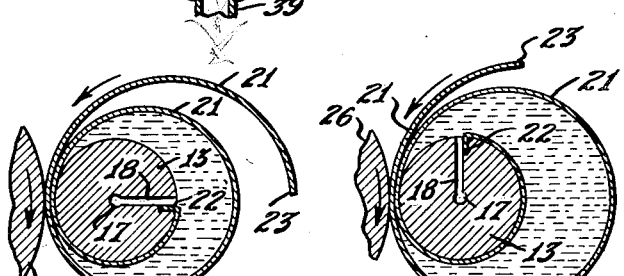
Figure 6:
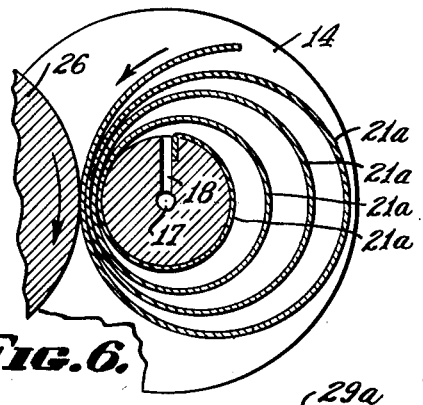
Figure 7:
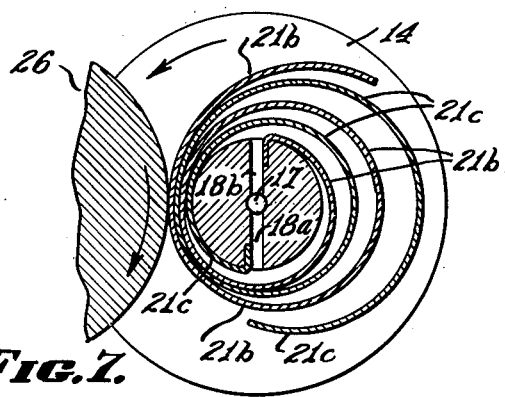
Figure 8:
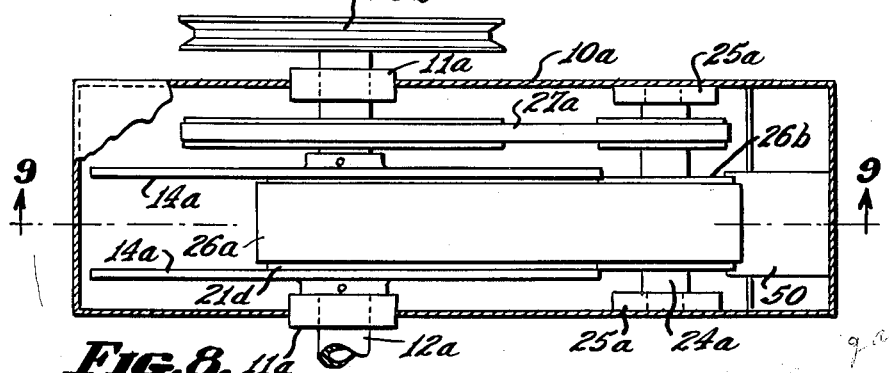
Figure 9:
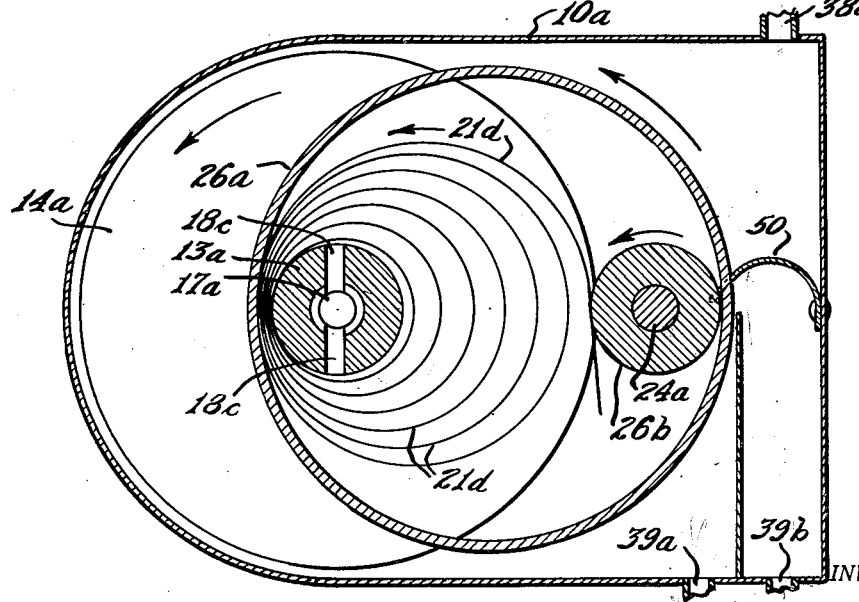
Figure 10:
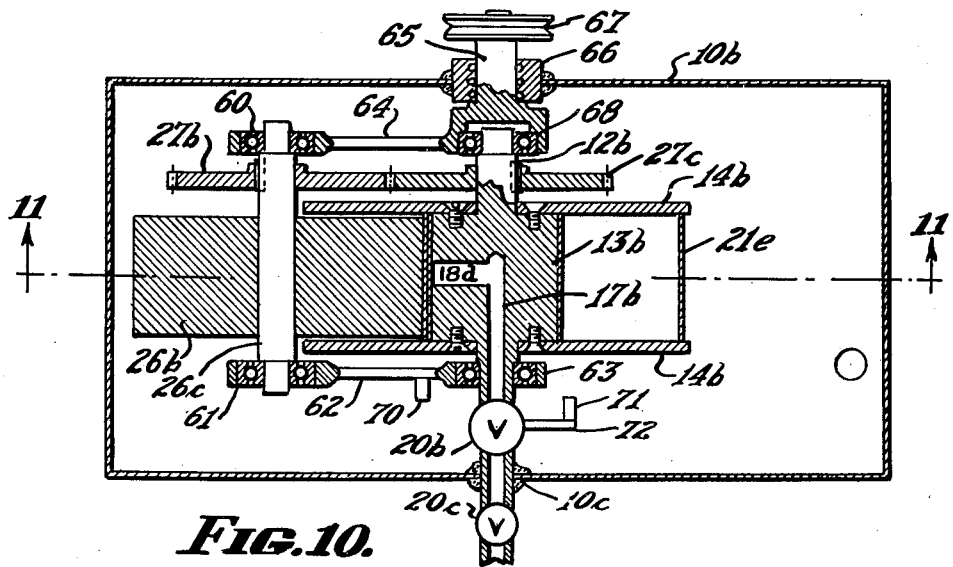
Figure 11:
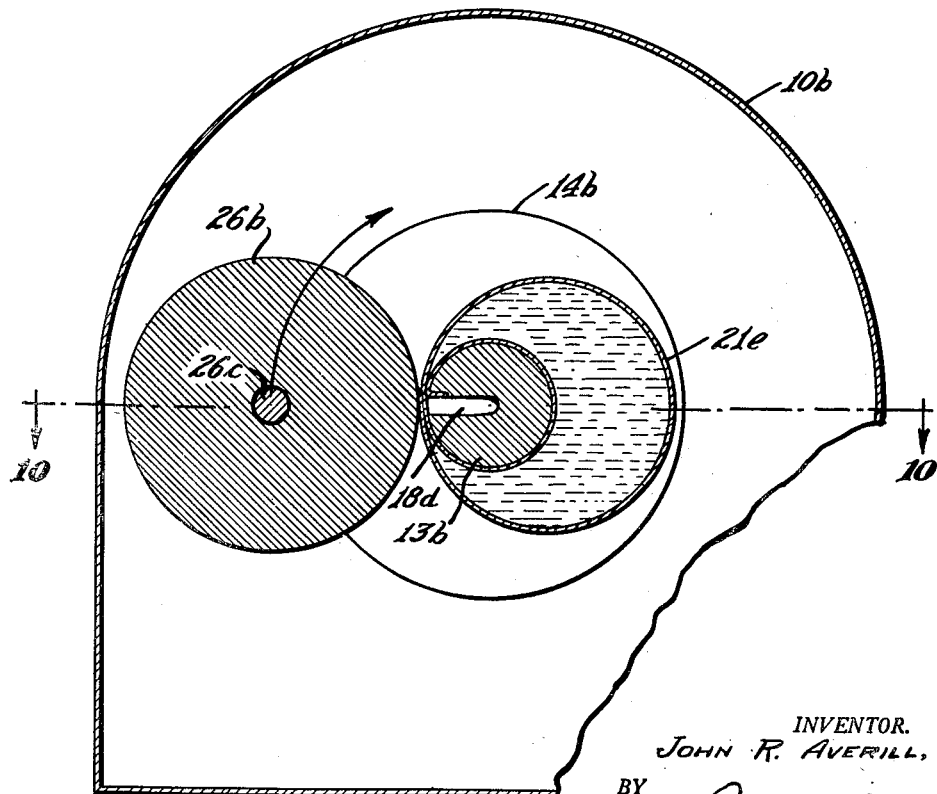

These and other objects of the invention, which will be set forth in more detail hereinafter, or which will be apparent from a study of the specification I accomplish by that certain construction and arrangement of parts of which I shall now disclose certain exemplary embodiments. Reference is made to the drawings forming a part hereof, and in which:

Figure 1 is a horizontal cross sectional view through an expansion engine according to my invention, taken on the line 1—1 of Figure 2, Figure 2 is a vertical cross sectional view of the same taken on the line 2—2 of Figure 1, Figure 3 is a fragmentary cross sectional view similar to Figure 2, but showing the parts in the position which they occupy after a quarter turn of the hub, Figure 4 is a view similar to Figure 3 showing the position of the parts after a half turn, Figure 5 is a view similar to Figure 4 showing the position of the parts after three-quarters of a turn, Figure 6 is a view similar to Figures 3 to 5 inclusive of a modified device, Figure 7 is a view similar to Figures 3 to 6 of yet another modification, Figure 8 is a view similar to Figure 1 of another form of expansion engine, Figure 9 is a cross sectional view of the same taken on the line 9—9 of Figure 8, Figure 10 is a cross sectional view of a modified engine, taken on the line 10—10 of Figure 11, and Figure 11 is a cross sectional view of the same, taken on the line 11—11 of Figure 10.

Briefly, in the practice of my invention in its simplest form, I provide a casing in which is mounted a flanged hub. The hub is provided with an axial passage, and a radial port communicates with the axial passage. An impervious strip of flexible material, such as spring bronze or the like, is secured at its one end to the hub, preferably immediately behind the port (in terms of the direction of rotation of the hub) and is loosely wound around the hub between the flanges, so that its free end trails in terms of the direction of rotation of the hub. The flexible strip is of such width that it can slide freely between the flanges and yet maintain a seal to prevent leakage of fluids around the edges, and is at least of such a length that it can form one tight convolution about the hub, and another convolution of a diameter substantially equal to the radius of the flanges plus the radius of the hub. The strip can, of course, be of greater length as will be described hereinafter. Means are provided for pressing the strip against the hub at one point, and such means may comprise a wheel of a width to fit between the flanges and bear against the strip, or the means may comprise a ring which will fit between the flanges and bear against the strip. If a ring is used, a wheel must be provided opposite the hub to maintain the ring in its operative position. It will be understood that a suitable stuffing box is provided in connection with the axial passage in the hub and the gas or gas-oil mixture enters the axial passage by way of a suitable stuffing box arrangement and through a valve to control the volume and pressure. The fluid passes through the hub and out through the radial port and emerges under the first convolution of the strip. At this point the fluid begins to expand and in expanding it pushes the strip away from the hub, causing the strip to slide past the hub at the point of contact and to turn the hub. The wheel or ring, as the case may be, is geared back to the hub shaft, and turns the hub in such a way as to reform a small convolution against the hub as the first convolution expands. The gear ratio is such, that by the time the coil expands to its maximum permitted size, it will turn the flanged hub sufficiently to rotate one turn. One turn of the flanged hub shaft reforms the inner convolution, and provides a new compartment for incoming fluids to work against before the outer end or free end of the strip slides under the point of contact, between the hub and the wheel or ring, and releases the expanded fluid which entered during the first revolution. With each turn of the flanged hub shaft, the cycle is repeated. The energy of the expanding gases is thus converted to rotary motion of the shaft, and the power obtained from the expanding gases in excess of that required to turn the engine itself can be taken off one of the shafts to perform useful external work. In order that the lowest temperature and maximum condensation of the outgoing products be attained, this power should be taken off and dissipated outside the machine.

Referring now more particularly to the drawings, I have shown in Figure 1 a casing 10 within which the working parts of the engine are mounted. The casing 10 is provided with bearing bosses 11 in which is journaled a shaft 12, having a hub 13. Flanges 14 are secured to both ends of the hub. A suitable stuffing box arrangement, generally indicated at 15, may be secured to the casing 10 by means of a bracket 16, but the particular stuffing box will not be described in detail since it forms no part of the present invention. The portion of the shaft 12, which extends into the stuffing box 15, is provided with an axial passage 17 which communicates with a radial port 18 in the hub proper. A supply line 19, provided with a suitable valve 20, communicates with the end of the shaft 12 and the passage 17.

Secured to the hub 13 is an impervious flexible strip 21, which may be of spring bronze or similar material. One end of this strip 21 is secured to the hub as at 22, preferably immediately behind the port 18 in terms of the direction of rotation of the hub. The strip 21 is of a width to fit snugly between the flanges 14 and is of a length at least sufficient to form one tight convolution about the hub 13 and one additional convolution of a diameter equal substantially to the radius of the flanges plus the radius of the hub as clearly seen in Figure 2. The strip is wound around the hub in the opposite direction to the direction of rotation of the hub so that its free end 23 trails in terms of the direction of rotation of the hub.

In the embodiment of Figures 1 to 7 inclusive, another shaft 24 is journaled in bearing bosses 25 in the casing 10 and the shaft 24 carries a wheel 26, which is of a width to fit freely between the flanges 14 of the hub 13. As clearly seen in Figures 1 and 2, the wheel 26 bears against the strip 21 and holds it against the hub 13. The shafts 12 and 24 are geared together by means of a gear 27 on the shaft 24 and the gear 28 on the shaft 12. Thus the two shafts are geared together to rotate in opposite direction at a fixed ratio to each other. This ratio is chosen such that the peripheral speed of the wheel is greater than the peripheral speed of the hub, so that a shearing action is set up on the strip between the wheel and hub. This shearing action results in slippage between the loops of the strip and between the strip and the hub, with preferably no slippage between the wheel and the strip. The materials of the strip and wheel are selected with a view to obtain a maximum coefficient of friction between the wheel and the strip. Under ideal conditions, therefore, the peripheral speed of the wheel and the peripheral speed of the outer convolution of the strip are the same. Since the inner or attached end of the strip turns at the peripheral speed of the hub, the greater speed of the wheel will cause the strip to belly out from the hub everywhere except at the point of contact as the shafts rotate. The ratio of the gearing between the two shafts will be the same as the ratio of the wheel circumference to the maximum outer loop circumference of the strip, provided there is no slippage between wheel and strip. In actual practice, there will be some slippage at the point of contact, the strip will move somewhat faster peripherally than the wheel when fluid pressure is applied at the inlet port 18, and the maximum outer loop will be correspondingly enlarged. The maximum outer loop, under operating conditions, should still be entirely retained between the flanges 14.

A pulley 29 is provided on the shaft 24 for power take-off, and a suitable mechanism may be provided for actuating the valve 20. As shown in Figure 1, this mechanism may comprise an eccentric 30 on the shaft 12, and a follower stem 31 slidable in the bearings 32 and 33 and having a follower 34 riding on the eccentric 30. An arm 35 secured to the rod 31 may operate the valve lever 36 which is urged in a clockwise direction by the spring 37. A manual throttling valve may be provided at 20a for adjusting the quantity of admitted fluids to control speed and/or power output of the machine. It will be understood that various valve operating mechanisms could be provided, and that fluid can be admitted at any desired stage of rotation of the hub and may be cut off at any desired stage of rotation so that further power is achieved through expansion of the gases. The machine will operate without the cutoff type of valve as described above. A simple throttling valve in the inlet line would be the minimum requirement, allowing fluids to enter during the entire 360 degrees of rotation of the hub. Speed and power output would be governed by pressure drop across the valve. Full line pressure downstream from the valve would be on the expansion chamber throughout the cycle. This would be permissible in a liquid-driven machine but would be undesirable in a gas-driven machine in that expansion of the activating gas could not take place within the machine. In a multi-stage machine to be described, however, the initial stage could operate at line pressure with expansion taking place in subsequent stages. As best seen in Figure 2, a gas outlet is indicated at 38 and a liquid outlet at 39.

For a better understanding of the operation of the expansion engine, Figures 2 to 5 inclusive may be considered together. In these four figures the hub 13 is shown at 90° intervals in its counter-clockwise rotation. Thus, in Figure 3, gas or the gas-oil mixture entering through the line 19, the axial passage 17 and the port 18, enters the crescent shaped space between the hub and the inner convolution of the strip 21. As the gas enters it pushes the strip away from the hub which causes the strip to slide past the hub at the point of contact with the wheel 26, and therefore, causes the wheel 26 to turn. Since the wheel 26 is geared back to the hub 13, the hub 13 is caused to turn and to reform a small coil tightly around the hub as the first coil expands. As pointed out above, the gear ratio between the gears 27 and 28 is such, that by the time the outer convolution has expanded to its permitted maximum size, it will have turned the wheel a sufficient amount to cause the shaft 12 and hub 13 to rotate one turn. Thus, when the shaft 12 and its hub 13 have completed one revolution, the inner coil has been reformed to the position shown in Figure 2. At this point the crescent shaped chamber has achieved its maximum size, and as soon as the hub has turned slightly more in a counter-clockwise direction to free the end 23 of the strip from between the hub 13 and the wheel 26, the gas and the liquid within the crescent shaped chamber are free to pass into the casing 10. This is a position which would occur immediately after the position of Figure 2 and just before the position of Figure 3.

The liquid components will accumulate against the point of contact between the strip and the hub by the motion of the flanges and the strip and these liquid components will be held at this point until the next revolution when the free end of the strip passes the point of contact and releases them. When the liquid components are released, they pass around or under the wheel and are thrown off by centrifugal force against the walls of the housing from where they flow downwardly to be piped off through the line 39. The gases, of course, are removed through the line 38. Thus the housing serves as a separator and separates the spent gases from the liquid phase without foaming.

As for the solids and semi-solids (hereinafter called waxes on account of their plastic or mushy physical appearance when precipitated) which may accompany the gas-oil mixture, these may precipitate in the expansion chamber. Whether they precipitate on the flange walls or on the strip, they will gradually be transported to the point of contact of the strip and hub and the waxy precipitation will assist in maintaining a seal between the sliding contacts against the escape of expanding gases during this operation. The wax which accumulates at the point of contact is pushed along the strip to its end and may either be permitted to be discharged along with the oil phase, or it may be separately collected as will be described in connection with another embodiment. Because of the low temperature of the liquid when it emerges from the expansion engine, wax solubility will be at its lowest and the wax will, therefore, be precipitated within the expansion chamber to its optimum degree. If equilibrium conditions are attained within the expansion chamber, further deposition of waxy materials will be impossible.

The principle discussed herein above can be extended to multi-stage operation. Thus, if the length of the strip is increased, it may form several coils around the hub, and this is advantageous if complete precipitation of the wax in the expansion chamber is important. Thus, for example as shown in Figure 6, if the strip 21a is twice the minimum length set forth above, it can provide four convolutions around the hub so as to give three expansion chambers in series instead of a single expansion chamber. In this way, an entering charge of high pressure fluids will remain in the expansion system for three revolutions of the hub instead of one. In this way, the oil from which the wax precipitates will contact more coil area for a longer period of time, and a closer approach to equilibrium conditions is attained than would be possible in a single stage machine. Furthermore, the four convolutions of the strip provide additional sealing area, so that there is less pressure drop across each line of sealing contact between the strip and the flanges and consequently, there is less overall leakage. Furthermore, the same amount of slip at the point of contact is divided between more surfaces so that friction within the machine is decreased. It will have to be borne in mind that the additional length of strip will, of course, provide more drag against the flanges, which would tend to offset the advantage of decreased friction. Additional advantages are provided by multi-stage operation. In the first place, there is a tendency toward a differential type of separation of gas from oil, and secondly, there is a tendency to continuously condense and return to the liquid phase the heavier fractions of the gaseous phase. Both of these results are beneficial to the producer because they assist in retaining a maximum amount of the light ends of the production in the valuable liquid phase rather than in the less valuable gaseous phase. An additional benefit will be found in a reduction of the temperature of the exhaust fluids by the removal of additional energy during expansion.

To clarify what is meant by differential separation, a batch type of distillation may be cited as exemplary. The gas phase is continuously removed from contact with the liquid phase as fast as it is formed. This inherently results in a more complete separation of the lowest boiling components, and a more complete retention of the intermediate fractions in the final liquid phase than can be attained by a flash type of reduction, which may be exemplified by the conventional practice of flashing the production of a well through an orifice to reduce the pressure. In the multi-stage expansion engine described above, while the liquid and gas phases remain in the same compartments during the entire expansion, they are segregated by the motion of the machine. The expansion chambers, as clearly seen in the drawings, are crescent shaped with the horns of the cresent to either side of the point of contact with the hub. The motion of the machine in rotation tends to draw the liquid components into the horn of the crescent, which is approaching the point of contact, while the gas phase will occupy the remainder of the expansion chamber. Thus, there is very little liquid surface exposed to the gas, although the liquid is held in a state of rather violent agitation by the coils of the strip as they slide past the fluid and under the point of contact. Since there is little surface exposed, there is little chance for the gas, which has been liberated, to recontact the liquid at lower pressure, and this condition, therefore, approaches that of a true differential separation.

The fractionating action which has been discussed, arises from the fact that each expansion chamber is cooler than the adjoining inner expansion chamber and warmer than the adjoining outer expansion chamber. The fluid in an expansion chamber will tend to cool the inner convex wall of its chamber and be cooled by the outer concave wall of its chamber. If the cooling action on the concave surface is sufficient to liquefy any of the heavier components of the gas phase, the condensate will be transported by movement of the strip up to the point of contact where it will rejoin the liquid portion of the fluids.

In Figure 7 I have shown a modification wherein two strips are attached to the hub with entrance ports under each strip. This provides for expansion stages in parallel as well as expansion stages in series, and if the motivating fluid is introduced in two or more increments per revolution, a smoother operation will result. Friction at the point of contact between the strips may be reduced by using strips of dissimilar material. The same advantage may, of course, be gained by the use of a single strip having dissimilar surfaces. The two strips in Figure 7 are indicated at 21b and 21c and the radial ports are indicated at 18a and 18b.

Still another modification of the expansion engine is shown in Figures 8 and 9. The principles employed in the device of Figures 8 and 9 are substantially the same as those discussed above, except that instead of a convex surface of revolution to hold the convolutions of the strip against the hub, I have shown the use of a concave surface of revolution in the form of a ring. In the device of Figures 8 and 9, a casing is provided at 10a and a shaft 12a is mounted in suitable bearings 11a. The shaft 11a carries a hub 13a having an axial passage 17a, and in this instance, two radial ports 18c. A strip of flexible material similar to those described above is indicated at 21d.

Instead of using a wheel 26 as described in connection with Figures 1 to 7 inclusive, I employ a ring 26a providing a concave surface of revolution to bear against the convolutions of the strip and to press them against the hub 13a. The ring is held in position by an additional disc 26b mounted on a shaft 24a, mounted in bearings 25a. In Figures 8 and 9 I have illustrated the shafts 24a and 12a as being geared together by belting, indicated at 27a. The hub 13a is again provided with flanges 14a and the strip 21b is of such a width as to fit snugly between the flanges 14a, while the ring 26a fits loosely between the flanges as clearly seen in Figure 8. The belting 27a is arranged so that the shafts 12a and 24a rotate in the same direction whereby the ring 26a also rotates in the same direction. The speed ratio is determined again by the circumference desired of the outer loop of the coil against which the ring 26a bears. The ratio of the circumference of the outer loop to the circumference of the wheel 26b will have to be the same as the ratio of the pulleys through which the shafts 12a and 24a are belted together. In the embodiment of Figures 8 and 9 I have shown three connections to the casing. The connection 38a serves for the removal of the gaseous phase, as in the embodiment of Figures 1 and 2, while the connection 39a is for the removal of the liquid phase as before. Another fitting 39b serves for the removal of the wax, which will be collected off the strip 21d on to the wheel 26b, whence it is scraped off by the scraper 50. The wax collecting on the surface of the wheel 26b will, by contact with the ring 26a, be squeezed out toward the side faces of the wheel 26b and the scraper 50 removes the wax from the side faces of the wheel 26b. In Figure 8 I have shown a power takeoff pulley at 29a mounted on the shaft 12a, whereas in the embodiment of Figures 1 and 2 power is taken off the shaft 24. While power may, of course, be taken off either shaft, the arrangement of Figures 1 and 2 is preferable because then the gearing or belting between the two shafts is called upon to transmit less power than in the embodiment of Figures 8 and 9.

As far as dimensions are concerned, it may be pointed out the maximum expansion space is obtained when the flanges 14 or 14a are of a diameter approximately three times the diameter of the hub 13 or 13a. Also, it may be noted that within the limits of flexibility of the strip, the wider the strip is the better the operation will be. The reason for this is that a wide strip will have the same length of sealing as a narrow strip, but will contain a larger volume of expanding gases for the same sealing area.

The foregoing description has related to embodiments of the invention wherein the two shafts rotate on stationary axes. Actually the essential point is that the flanged hub and the point of contact between the hub and surface of revolution have relative movement.

In some instances it may be desirable to have the hub non-rotatably mounted in the casing and to provide means whereby the point of contact between the hub and surface of revolution moves in a planetary orbit about the hub. Thus, in one embodiment the surface of revolution may be constituted by a wheel which rolls around the outside of the hub to press the flexible strip against the hub.

This can be accomplished by an arrangement whereby the second shaft may travel orbitally about the hub shaft in the casing. Thus in Figures 10 and 11 I have shown an arrangement wherein the shaft 12b is fixed to the casing 10b by welding, brazing or other suitable means, as at 10c. Thus the shaft 12b and the hub 13b are stationary with respect to the casing 10b. The hub is provided with flanges 14b as before and a flexible strip 21e. The hub has the axial passage 17b and the radial port 18d. Valves 20b and 20c are provided for the passage 17b and correspond to the valves 20 and 20a of Figure 1.

In this instance however the wheel 26b is mounted in bearings 60 and 61. The bearing 61 is at one end of an arm 62, the other end of which is journaled by means of a bearing 63 about the shaft 12b. The bearing 60 is mounted on the end of an arm 64 which is integral with or secured to a stub shaft 65 mounted for rotation in a bearing and stuffing box 66 and provided with a pulley 67 for power take-off. The member 65 has an internal bearing at 68 by means of which it rides on the end of the shaft 12b. Thus the wheel 26b, together with the arms 62 and 64 and the member 65, rotates so that the wheel 26b moves in a planetary orbit about the hub 13b. Therefore the point of contact between the hub and the strip moves in a planetary orbit about the hub.

As before a gear 27b is provided on the shaft 26c and a gear 27c is secured to the shaft 12b. The ratio of these gears is again chosen to provide the peripheral speed ratio between the peripheral speed of the wheel 26b and the peripheral speed of the outermost convolution as discussed above.

In Figures 10 and 11 a slightly different arrangement for actuating the valve 20b is provided. A lug 70 on the arm 62 projects into the path of a lug 71 secured to the valve stem 72 of the valve 20b. As the assembly rotates, the lug 70 will abut the lug 71 and actuate the valve once during each revolution.

In the interest of simplicity a single wheel 26b has been shown, but it will be clear that better balance can be achieved by another wheel 26b similarly mounted in a diametrically opposite position or by a plurality of wheels 26b symmetrically spaced about the periphery of the hub 13b.

It should also be noted that the apparatus will work without a casing, since the expansion chamber or chambers are provided between the flanges and the convolutions of the flexible strip; nevertheless, for convenience as well as for appearance's sake, I prefer to provide a casing as shown.

It will be understood that numerous modifications may be made without departing from the spirit of the invention and therefore, I do not intend to limit myself in any manner other than as pointed out in the claims which follow.

Having now fully described my invention, what I claim as new and desire to secure by Letters Patent is:

1. An expansion engine comprising a flanged hub, an axial passage in said hub and a radial port in said hub communicating with said passage, an impervious strip of flexible material, of substantially the width of said hub between said flanges, secured at one of its ends to said hub, and loosely wound around said hub so that its free end trails in terms of the direction of rotation of said hub, said strip being of a length at least sufficient to form one convolution tightly around said hub plus an outermost convolution of a diameter substantially equal to the radius of the flanges plus the radius of said hub, a surface of revolution contacting said strip in frictional driving relation and pressing it against said hub, means for producing relative rotation between said hub and the point of contact between said hub and surface of revolution, said hub and surface of revolution being geared together at a predetermined ratio.

2. An engine according to claim 1, wherein the surface speed ratio between said hub and said surface of revolution is substantially equal to the ratio between the circumference of said hub and the maximum circumference of said outermost convolution, so that when said hub makes one revolution with respect to said point of contact said outermost convolution also makes one revolution with respect thereto.

3. An engine according to claim 1, wherein said flexible strip is of a length to form one convolution tightly around said hub, a plurality of convolutions of progressively increased size, and an outermost convolution of a diameter substantially equal to the radius of the flanges plus the radius of said hub.

4. An engine according to claim 1, wherein an enclosing casing is provided, said casing having a liquid discharge port and a gas discharge port.

5. An engine according to claim 4, wherein said flexible strip is of a length to form one convolution tightly around said hub, a plurality of convolutions of progressively increased size, and an outermost convolution of a diameter substantially equal to the radius of the flanges plus the radius of said hub.

6. An engine according to claim 5, wherein the surface speed ratio between said hub and said surface of revolution is substantially equal to the ratio between the circumference of said hub and the maximum circumference of said outermost convolution, so that when said hub makes one revolution with respect to said point of contact, said outermost convolution also makes one revolution with respect thereto.

7. An engine according to claim 5, wherein scraping means are associated with said surface of revolution to remove waxy precipitate therefrom, and separate outlet means in said casing for said waxy precipitate.

8. An engine according to claim 1, wherein said surface of revolution is the outer surface of a wheel, and the peripheral speed of said wheel is substantially equal to the peripheral speed of said additional convolution.

9. An engine according to claim 1, wherein there is provided in said hub an additional radial port, and in which a second impervious strip of flexible material is secured to said hub in the same relation to said additional radial port as said first mentioned strip is secured with regard to said first mentioned radial port.

10. An engine according to claim 9, wherein scraping means are associated with said surface of revolution to remove waxy precipitate therefrom, and separate outlet means in said casing for said waxy precipitate.

11. An engine according to claim 1, wherein power take-off means are provided in connection with said surface of revolution.

12. An engine according to claim 1, wherein a valve is associated with said axial passage, and wherein means are provided to actuate said valve in timed relation to the rotation of said hub with respect to said point of contact.

13. An engine according to claim 1, wherein said surface of revolution is the inner surface of a ring.

14. An engine according to claim 13, wherein said ring is supported by said hub and by a wheel, said wheel and the inner surface of said ring being also in frictional driving relation, the other side of said wheel being in frictional dragging relation with the outermost convolution and wherein said wheel and hub are geared together.

15. An engine according to claim 14, wherein the speed ratio between said hub and wheel is such that the maximum diameter of the outermost convolution is substantially equal to the radius of the hub plus the radius of the flanges.

16. An engine according to claim 15, wherein scraping means are associated with said wheel to remove waxy precipitate therefrom, and separate outlet means in said casing for said waxy precipitate.

17. An engine according to claim 1, wherein said surface of revolution is the outer surface of a wheel, and wherein said hub is fixed and said wheel is mounted on arms journaled with respect to said hub, so that said wheel and its point of contact with the hub moves around said hub in a planetary orbit.

JOHN R. AVERILL.

No references cited.